United States Patent [19]

Millheiser

[11] 3,995,360

[45] Dec. 7, 1976

[54] SELF-LOCKING RETAINING RING ASSEMBLY TOOL

[75] Inventor: Melvin Millheiser, North Bellmore, N.Y.

[73] Assignee: Waldes Kohinoor, Inc., Long Island City, N.Y.

[22] Filed: Nov. 11, 1975

[21] Appl. No.: 631,192

[52] U.S. Cl. .................................. 29/229; 29/451; 29/525

[51] Int. Cl.[2] .......................................... B23P 19/08

[58] Field of Search ............ 29/229, 270, 278, 280, 29/451, 211 M, 235, 525, 212 D

[56] References Cited

UNITED STATES PATENTS

| | | | |
|---|---|---|---|
| 2,422,549 | 6/1947 | Hogin | 29/278 X |
| 2,510,206 | 6/1950 | Barkan | 29/451 X |
| 2,814,858 | 12/1957 | Erdmann | 29/229 |
| 2,885,770 | 5/1959 | Wurzel | 29/229 |
| 3,030,700 | 4/1962 | Jensen | 29/229 |
| 3,387,352 | 6/1968 | Walter | 29/211 M |
| 3,538,587 | 11/1970 | Shurtleff | 29/229 X |

*Primary Examiner*—Al Lawrence Smith
*Assistant Examiner*—J. C. Peters
*Attorney, Agent, or Firm*—Burns, Doane, Swecker & Mathis

[57] ABSTRACT

An assembly tool for closed, self-locking retaining rings includes an extensible and retractable, tubular, centering sleeve for centering the ring on a ram recessed relative to the sleeve. The sleeve is carried by a housing in telescoping relationship with the ram. One end of the sleeve is fashioned with a plurality of circumferentially spaced guide slots bounded by circumferentially spaced rigid guide and centering fingers that are operable to center the ring by engagement with the ring body and to pilot the tool by engagement with the member to which the ring is to be assembled. Adjustable stops may control the position of the ring in an assembly in axial relationship to the parts of the assembly.

27 Claims, 15 Drawing Figures

SELF-LOCKING RETAINING RING ASSEMBLY TOOL

BACKGROUND OF THE INVENTION

This invention relates to the assembly of self-locking retaining rings. More particularly, this invention relates to the assembly of self-locking retaining rings having a plurality of circumferentially spaced locking prongs projecting from a ring body.

Internal and external retaining rings having a narrow gap and which are equipped with lugs on both sides of the gap are generally assembled and disassembled by means of pliers. Many retaining rings with a wide gap such as E-Rings are assembled by means of fork-like applicators, and some types and sizes are assembled by means of magazine fed assembly tools.

The foregoing types of assembly tools are not suitable for the assembly of closed self-locking rings. Prior to the present invention only rather primitive tubular plungers for assembly of such self-locking rings have seen widespread use notwithstanding the fact that closed self-locking rings have been manufactured for decades.

One such application tool for use in connection with external, closed self-locking rings comprises a tubular plunger having a front end with a recessed groove in which the ring may be magnetically seated. The tubular plunger is employed to place the ring over the shaft on which it is to be mounted. For assembly of internal, closed self-locking rings it has been suggested that a mandrel be employed to effect entry into the housing bore in which the ring is to be positioned.

Although such primitive tools may be acceptable for some purposes, they are not entirely desirable for a number of reasons.

For example, if the rings are accidentally misaligned with the shaft or housing onto or into which they will be installed during assembly, such misalignment is aggravated by unequal forces acting on the locking prongs. As a result, some of the prongs may be severely deformed during installation, and the assembled ring will not withstand the required load.

In addition, since the tools are arranged so that the ring itself first enters the housing or is placed over the shaft, it had become commonplace to employ rings where the locking prongs were inclined to provide a lead-in for the ring assembly. With such rings, however, it is imperative that the ring be oriented for assembly with the prongs inclined away from the assembly direction. Otherwise prong breakage will almost certainly occur and the assembly will have to be repaired or discarded.

Accordingly, it is important to employ reasonably skilled persons to handle the assembly operation with the rather primitive prior art tools, and even then the process of appropriately centering and orienting the ring can be quite time consuming and hence costly.

In a prior U.S. Pat. No. 2,885,770, issued May 12, 1959 to the assignee of the present invention, there has been proposed a somewhat more sophisticated tool for assembling a particular type of closed, internal self-locking retaining rings. The tool disclosed in that patent contemplates the provision of a cup-shaped body member having an outer diameter corresponding to the diameter of the bore into which the ring is to be assembled and presenting an open-end edge on which the ring is to be seated prior to assembly. Also contemplated is the provision of means for releasably securing the ring seated on the open edge. This means is to take the form of a disc member that abuts the body member, three equidistantly spaced arms slidable within slots in the body member, and spring fingers accommodated by recesses and slots in the arms.

A single tool of this type lacks ready adaptability to rings of different size, and the machining of an acceptable tool for smaller ring sizes on the order of one-half inch or the like would be extremely difficult if not impossible.

In addition to complications that can be envisioned as associated with the reliable manufacturing of such a tool with a complex configuration of the disc, arms and slots, and the apparent limited utility of the tool to a particular type of internal self-locking retaining ring, it will be appreciated that several operational difficulties could also be encountered.

For example, since the spring fingers are flexed during ring seating and ring release, there is a danger that after a period of use the intended centering of the ring would be defeated by reasons of nonuniform flexure and bias characteristics of the springs being induced. Similar misalignment problems could occur because of damage to the spring fingers, which are exposed, during normal handling of the tool. Moreover, even without such difficulties, problems with the reliability of initial spring uniformity and/or positioning of the spring fingers, coupled with the ability of the ring to undergo significant radial displacement during its assembly, could produce misalignment problems, and attendant adverse consequences of the type discussed above in connection with primitive tools actually in use today.

Further complications of this type could be induced by the particular arrangement disclosed for biasing the disc arms and spring assembly into engagement with the body member. Limited deflection characteristics of the biasing spring, its external tool location and the tolerances which it must take up might produce additional unreliability.

OBJECTS AND SUMMARY OF PREFERRED FORMS OF THE INVENTION

It is, therefore, a general object of the present invention to provide a novel tool for assembling self-locking retaining rings which obviates or minimizes problems of the sort previously noted.

It is a particular object of the present invention to provide for more reliable assembly of such rings.

It is a further object of the present invention to provide a novel tool for assembly of self-locking retaining rings which is capable of being handled with less skill than heretofore.

It is another object of the present invention to provide for more rapid assembly of such rings.

It is an additional object of the present invention to provide a novel tool for assembly of self-locking retaining rings which enables certain modifications of the rings that in turn reduces the cost of producing and maintaining tools for stamping the rings.

It is yet another object of the present invention to provide a novel tool for assembly of self-locking retaining rings that enables more closely controlled physical characteristics of the assembly.

It is a still further object of the present invention to provide a novel tool which is readily adaptable to assembly of a series of self-locking retaining ring sizes.

In preferred forms of the invention intended to accomplish the foregoing and other objects, a novel assembly tool for closed internal or external self-locking retaining rings is provided. The tool includes an elongate tubular housing and an axially extensible and retractable tubular sleeve means carried by the housing and mounted for slidable movement therein. Spring means biases the tubular sleeve means to an extended position with one end thereof projecting from the housing. Preferably the spring is a helically coiled spring carried within the housing.

That end of the sleeve is fashioned with a plurality of longitudinally extending and circumferentially spaced slots contoured for individual guiding reception of circumferentially spaced locking prongs projecting from the retaining ring body. The guide slots are bounded by circumferentially spaced, rigid guide and centering fingers presenting sidewalls of the guide slots and presenting two sets of circumferential centering faces.

One set of these faces of the rigid fingers is contoured for centering engagement with the peripheral extent of the ring body between the locking prongs. In the case of internal self-locking rings, that set of faces is the internal set of faces. The converse is the case for external rings.

The other set of these faces of the rigid fingers is contoured for tool centering engagement with the member which the locking prongs are to engage, i.e, a bore or a shaft in the respective cases of internal and external rings.

Ram means is carried by the housing coaxially with the sleeve and in telescoping relationship therewith. In the case of internal rings the ram is telescopingly disposed within the sleeve and the sleeve is slidable thereon. With external rings the ram is telescopingly disposed exteriorly of the sleeve and the sleeve is slidable therein. In either case, the ram means is operable to drive the ring into locked position.

In this regard, the ram presents a driving surface axially projecting from the housing to a position short of the extended sleeve position. The driving surface is magnetically engageable with the retaining ring body when the locking prongs are received in the guide slots of the sleeve. In response to resistance of axially advancing assembly force applied to the tool, the sleeve is operable to retract relative to the ram so as to transmit assembly force to the ring body through the driving surface of the ram.

Adjustable stop means may be provided for controlling the position of the ring in an assembly in axial relationship to the parts of the assembly. In the tool for internal rings, this may be accomplished by adjusting the projection of the driving surface of the ram from the housing, or by including an adjustable stop projecting beyond the driving surface of the ram to a position short of the extended position of the sleeve. With the tool for external rings an adjustable pin may be disposed interiorly of the sleeve at a location short of the driving surface of the ram, or an adjustable stop may be disposed exteriorly of the sleeve to project forward of the ram driving surface but short of the extended sleeve position.

Provision may also be made for easily changing the tool to accommodate different type and different size rings. In the case of the tool for internal rings, this is accomplished with a sleeve comprising a first section externally contoured in conformity with the housing interior and a removable second section containing the slotted end. At the same time, the ram comprises an end portion containing the driving surface and externally contoured to conform with the interior of the removable second portion of the sleeve. For a tool to apply external rings, the ram itself may comprise a second sleeve removably threaded to the housing. Then, the tubular slotted sleeve comprises a first section externally contoured in conformity with the housing interior and a second section exteriorly contoured to conform with the interior of the second sleeve.

The foregoing and other objects and advantages of the present invention will become apparent from the subsequent detailed description in connection with the accompanying drawings in which like reference characters represent like functioning elements, and in which:

THE DRAWINGS

DETAILED DESCRIPTION

Figure 1:
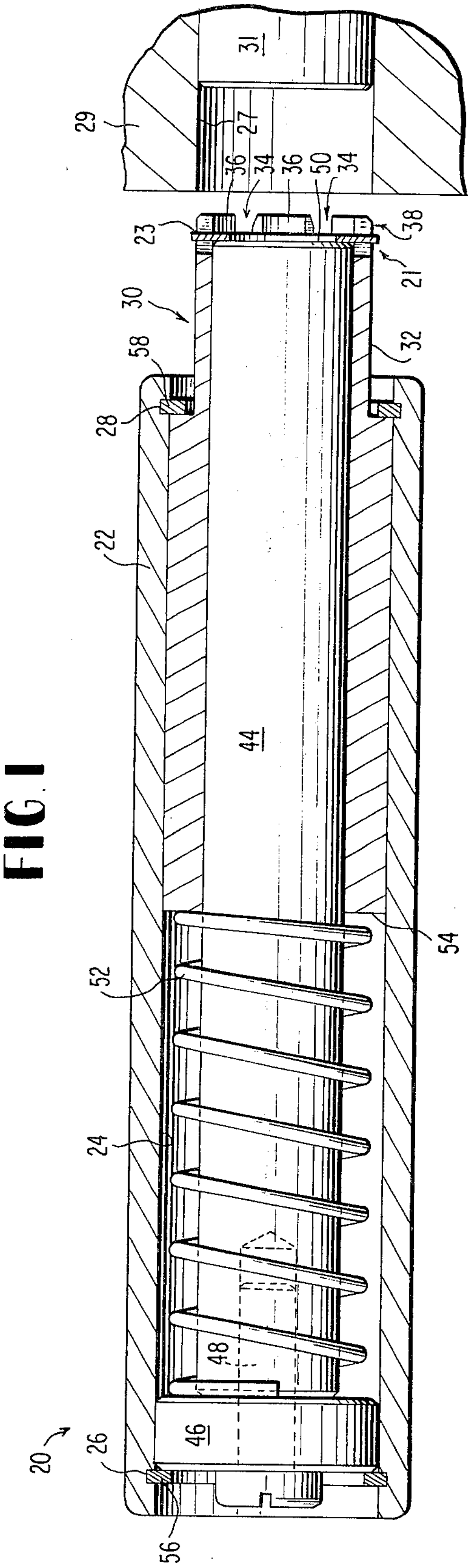
FIG. 1 is a transverse view, partially in longitudinal section, depicting one embodiment of a tool according to the present invention for assembling internal, closed self-locking rings in a bore.
Figure 3:
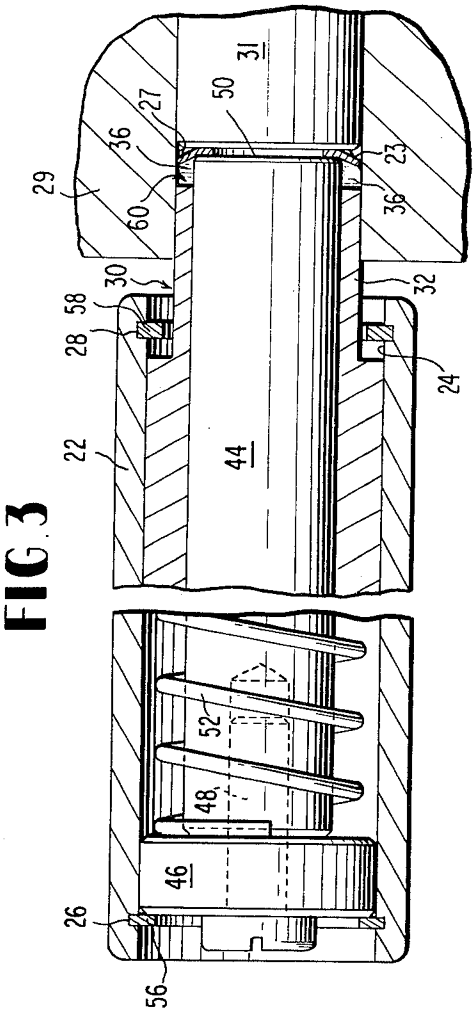
FIG. 3 is a partially broken transverse view similar to FIG. 1, but depicting a ring installation.
Figure 2:
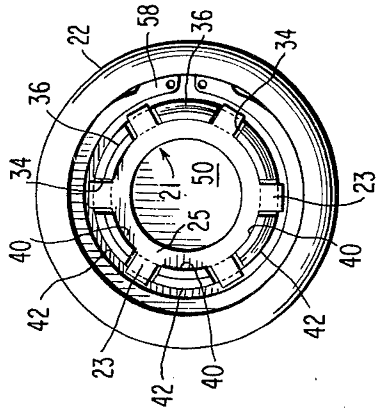
FIG. 2 is an end view of the tool of FIG. 1 looking toward the ring guide and centering fingers.

With reference to FIGS. 1–3, basic aspects of an assembly tool 20 according to the present invention will become apparent. The tool 20 may be employed to assemble closed internal retaining rings, one of which is depicted at 21.

The tool 20 includes an outer, elongate cylindrical housing 22 provided with an internal bore 24. The bore is provided with grooves 26 and 28 near each end of the tubular housing 22.

An inner tubular sleeve 30 which can slide axially in the bore 24 is carried by the housing 22. The sleeve 30 has a reduced diameter forward portion 32 into the end of which have been cut slots 34. These longitudinally extending and circumferentially spaced slots 34 are contoured for guiding reception of the circumferentially spaced locking prongs 23 projecting from the body 25 of the ring 21. Preferably the number of slots 34 corresponds to the number of prongs on the self-locking ring which the tool 20 will be used to install. In any event, several or all of the prongs 23 are individually received in individual ones of the guide slots 34.

The guide slots 34 are bounded by circumferentially spaced, rigid guide and centering fingers 36 which present sidewalls of the slots. The reduced diameter portion 32 of the sleeve 30 which contains the fingers 36 is provided at its forward end with a chamfered portion indicated at 38 in FIG. 1.

With particular reference now to FIG. 2, it will be seen that the rigid guide and centering fingers 36 also present two sets of circumferential faces 40 and 42. One set, in this case the inner set 40, is contoured for centering engagement with the peripheral extent of the ring body 25 between the locking prongs 23. The other set of circumferential faces 42, which terminate with the chamfered portion 38, is contoured for tool centering engagement with the member which the locking prongs 23 are to engage, in this case the bore 27 in a housing member 29.

Telescopingly oriented coaxially within the sleeve 30 there is a shaft or pin 44 which functions as a ram. The ram is carried by the housing 22 by means of a flange or washer 46 connected to the rear end of the ram with a screw 48. At the forward end of the ram 44 a driving surface 50 is provided. The outside diameter of the driving surface 50 is nearly equal to that of the body 25 of the ring.

A helically coiled compression spring 52 is carried within the housing 22 around the rear end of the ram in such a manner as to exert pressure against an inner end portion 54 of the sleeve 30 and against the inner face of the flange 46. The sleeve 30 and the washer 46 are limited in their displacement away from each other by retaining rings 56 and 58 seated in the aforementioned housing grooves 26 and 28.

The spring 52 thus biases the sleeve 30 to an extended position where the reduced diameter end 32 projects from the housing 22. The driving surface 50 of the ram 44 also axially projects from the housing 22 but to an extended position short of the extended position of the sleeve 30. The design of the amounts of these projections is determined by the length of the bore into which the ring is to be inserted.

With the prongs 23 of the self-locking retaining ring 21 received in the slots 34, the body 25 of the ring overlies the driving surface 50 of the ram 44. The ram 44 may be magnetized at its forward end 50 to aid in holding the ring in its preassembly position, centrally mounted in the slotted end of the sleeve 30 with the ring body 25 closely fitting against the internal guide faces 40 of the rigid fingers 36.

As indicated at 60 in FIG. 3, the slots 34 defining the fingers 36 are sufficiently deep to accommodate the bending of the prongs 23 during assembly of the ring.

Because of the accurate centering and guiding features of the present invention, a ring 21, such as the one illustrated, having locking fingers 23 that lie in the same plane as the ring body 25 may be readily assembled. Such rings with "in-plane" prongs are easier and more economical to produce since single station stamping tools would not require punches with special angles which must be dressed (resurfaced) when the tools are sharpened. Progressive stamping tools would not require special angle forming stations which add to their initial cost and make tool sharpening more expensive.

Although rings with in-plane prongs that are capable of assembly in either of two orientations may be conveniently assembled with the present invention, rings having inclined locking prongs, such as the type shown in U. K. patent specification No. 627,059 of July 27, 1949, may also be employed. In that event, the slots 34 are sufficiently deep to accommodate not only the prong bending but also the original incline of the prongs when the body of the ring is held against the driving surface 50 of the ram.

In either case, to accomplish assembly of the retaining ring after the ring is mounted on the forward end of the sleeve 30, that end of the sleeve merely needs to be axially inserted into the bore 27 of the housing 29 where the ring is to be finally located. As shown in FIG. 3, within the housing bore 27 is a shaft part 31 against which the ring 21 is to be assembled for purposes of retention.

The outer circumferential faces 42 of the fingers 36 present a diameter very nearly equal to that of the bore 27 and thus serve to orient the tool concentrically with the bore. Since the ring is held concentric against the inner circumferential faces 40 of the fingers, the ring is also positioned concentrically to the housing.

This line-up takes place before the ring enters the housing bore because the fingers 36 with their pilot chamfered portion 38 enter the bore 27 before the ring. Thus, the possibility of ring misalignment prior to the application of final assembly pressure is essentially eliminated.

After entry of the leading end of the tool 20 into the housing bore, further axial assembly force ultimately causes engagement of the fingers 36 with the part 31 to be retained. In response to this resistance to the axially advancing assembly force, the spring-biased sleeve 30 retracts relative to the ring and the ram 44 so as to transmit assembly or seating force to the ring body 25 through the front driving surface 50 of the ram. The ring 21 is thus axially advanced and pushed against the part 31 and frictional engagement of the locking prongs 23 against the bore wall causes the self-locking action to occur in the known manner, i.e., by out-of-plane bending of the prongs by reason of the interference fit between the prongs and the bore wall.

Throughout the entire operation of seating the retaining ring, the ring 21 is continually controlled and guided by reason of the location of the individual locking projections 23 in the individual slots 34 between the fingers 36, and by reason of the location of the inner circumferential faces 40 of the fingers 36 against the ring body 25. This restraint on the ring during seating ensures concentricity and proper assembly.

When the tool is withdrawn, the ring remains in its assembled position; and the restoring pressure of the compressed spring 52 causes the sleeve 30 to return from its retracted position of FIG. 3 to its extended position of FIG. 1.

With the foregoing ring installation the self-locking retaining ring 21 is pushed up against the face of the retained part 31 so that there is essentially no free play in the system after ring installation. However, in certain instances, particularly in the case of self-locking retaining rings of the type shown in U.S. Pats. No. 3,483,789 (issued Dec. 16, 1969 ) and 3,483,888 (issued Dec. 16, 1969 ), that type of installation may not be preferred.

Figure 5:
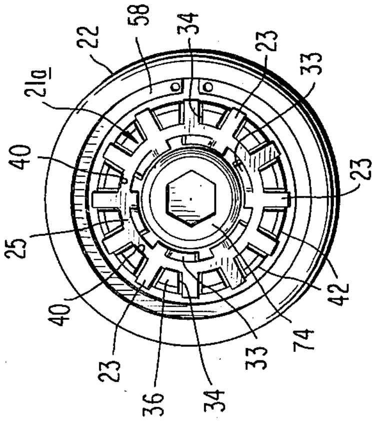
FIG. 5 is an end view of the tool of FIG. 4 looking toward the ring guide and centering fingers.

An internal ring 21*a* of that type is depicted in FIG. 5. In addition to the locking prongs 23, the ring includes a set of resilient spring fingers 33 on the opposite side of the ring body 25.

When such rings are installed, it may be desirable to position the rings such that the spring fingers will be preloaded the same for all assemblies. This is particularly useful in devices such as control knobs for potentiometers, or other instruments where the retained part must be free to rotate, but within specified torque limits. Such torque can be provided by pressure exerted by the resilient spring fingers 33 on the retained part 31 (FIG. 6), and will be dependent on the degree to which the resilient spring fingers have been displaced from their free position during the assembly of the ring. With the assembly tool 20 of the type depicted in FIGS. 1–3, maximum deflection of the spring fingers would take place when the ring is pushed "home", and the resulting pressure on the retained part may give torque values that are too high.

Figure 4:
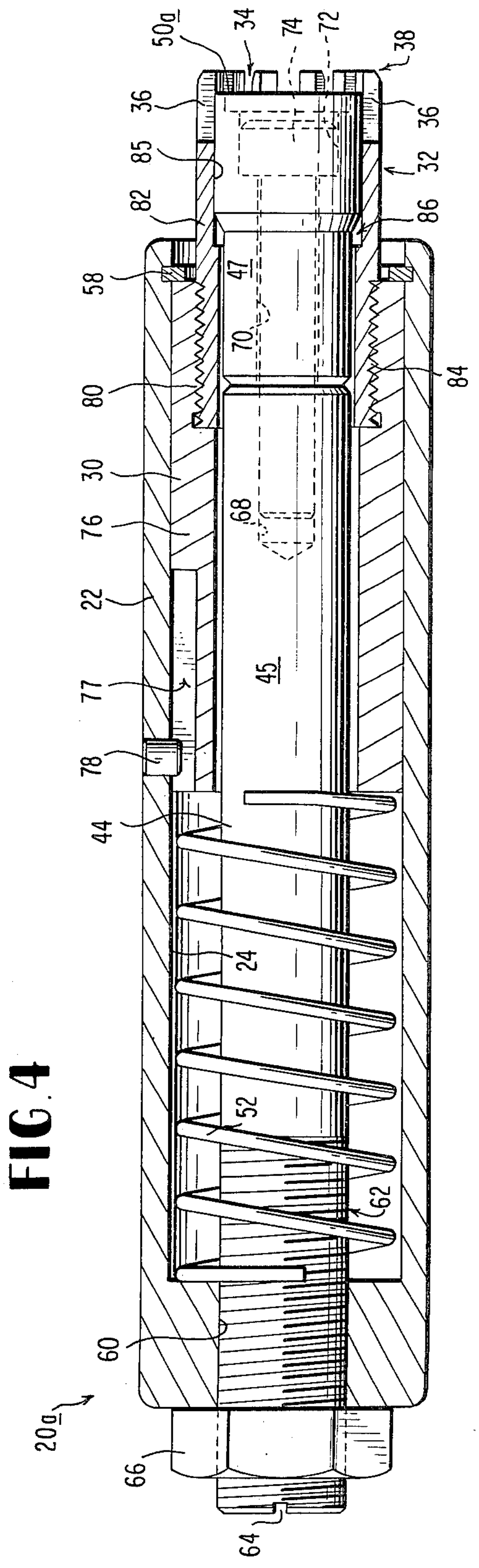
FIG. 4 is a transverse view, partially in longitudinal section, depicting a further embodiment of a tool according to the present invention for assembling internal, closed self-locking rings.
Figure 6:
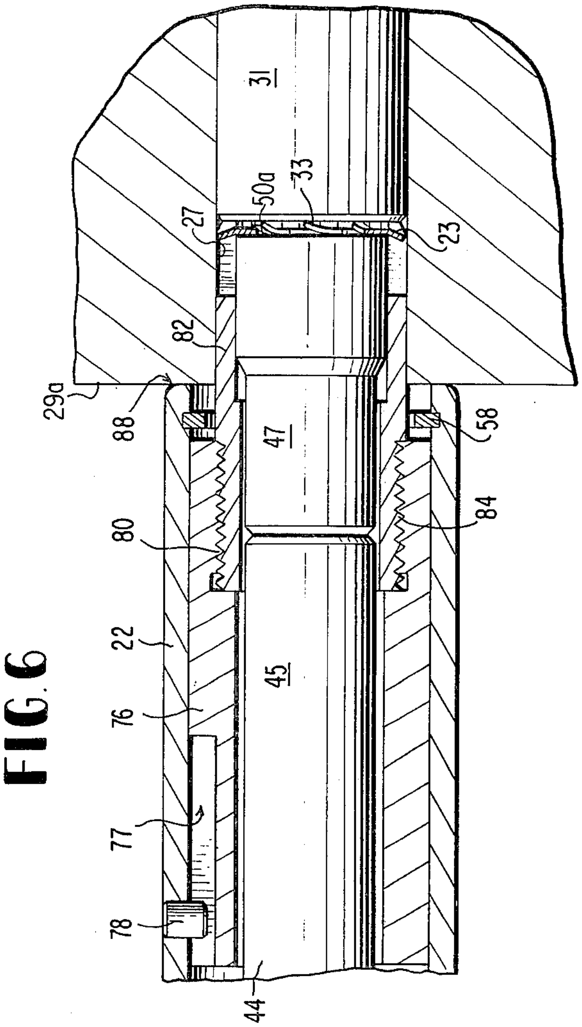
FIG. 6 is a partial transverse view of the tool of FIG. 4, depicting a ring installation in a bore.

In FIGS. 4–6, a tool 20*a* is depicted in which an adjustable stop is provided for controlling the position of such rings 21*a* in an assembly in axial relationship to the parts in the assembly. As an independent feature, the tool 20*a* is also designed to accommodate various ring sizes. Except as noted below, the tool 20*a* is otherwise substantially indentical in structure and operation to the tool 20 of FIGS. 1–3.

Referring to FIG. 4, it will be appreciated that the rear end of the housing 22 incorporates a threaded hole 60. The ram 44 includes a rear section 45 and a front section 47. The rear section is threaded at its rear end, as indicated at 62, and engages the threaded hole 60. A slot 64 is provided in the rear face of that ram section 45, and a locking collar or locknut 66 is threaded onto the section 45 outside of the housing 22. Adjacent its forward end, the rear section 45 of ram 44 just described contains a tapped or threaded hole 68.

The forward ram section 47 comprises an insert fitted with a through hole 70 and a counterbore 72. A suitable fastener 74 secures the forward ram section 47 to the rear ram section 45 by engaging the hole 68. As will be apparent, the forward ram section 47 contains the driving surface 50*a*.

The tubular sleeve 30 is also provided in two sections. The first section 76 is located entirely in the housing 22 and is externally contoured in conformity with the interior bore 24 of the housing. A longitudinal slot 77 is provided in the outer surface of this first sleeve section 76 for engagement by a pin 78, and internal threads 80 are located at its forward end.

A second sleeve section 82 contains the reduced diameter, slotted end portion 32. This sleeve section 82 is externally threaded at 84 so as to mate with the internal threads 80 of the other sleeve section 76.

At least the forward portion of the removable front ram section 47 is contoured in conformity with the interior of the removable front sleeve section 82 at its forward end, as indicated at 85. Preferably, both are necked down, as indicated at 86, to aid in assembly of different sections. In this connection, it will be apparent that the removed front ram and sleeve sections may be replaced by others designed to accommodate various ring sizes as desired.

As illustrated in FIG. 6, during a ring installation operation the driving surface 50*a* of the ram will penetrate the bore 27 until the front shoulder 88 of the tool housing 22 abuts the face 29*a* of the bore. The distance of this penetration may be varied by loosening the locknut 66 and turning the slotted end 64 of the ram with an ordinary screwdriver until the desired setting is achieved. The locknut 66 may then be retightened to hold the setting.

Such adjustment may be employed to advance or retract the driving surface 50*a* of the ram by a desired amount. This variance in axial setting will control the deflection of the spring fingers 33 of the retaining ring 21*a* by limiting the ultimate axial position of that ring when the installation force is transmitted thereto in response to retraction of the sleeve sections 76 and 82. Thus, the deflection of the spring fingers 33 against the retained part 31 will also be limited.

Figure 8:
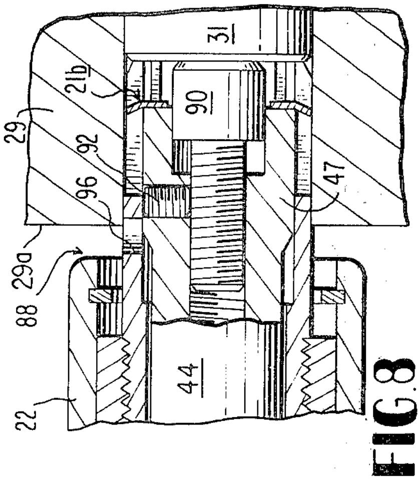
FIG. 8 is a partial transverse view depicting a ring installation in a bore with the tool of FIG. 7.
Figure 7:
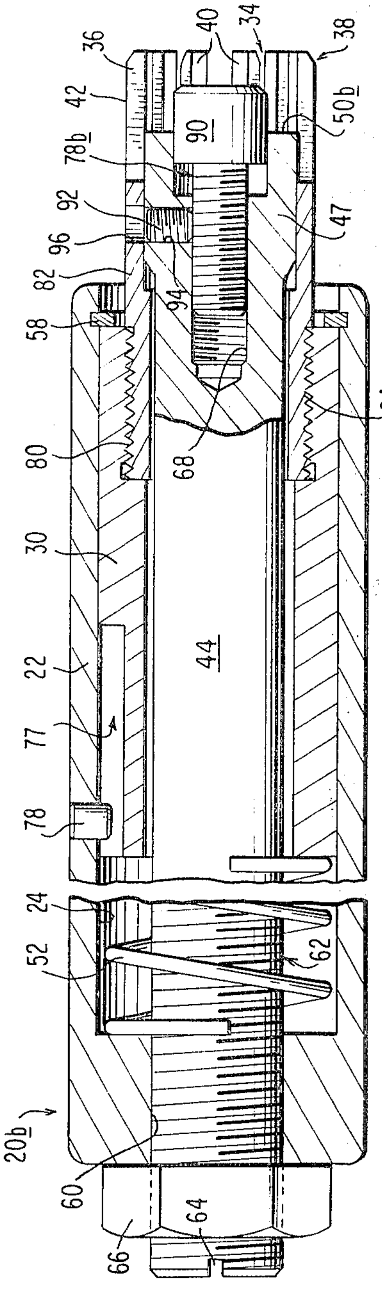
FIG. 7 is a partially broken transverse view of another embodiment of a tool according to the present invention for assembling internal, closed self-locking rings with portions of the tool shown in longitudinal section.

Turning now to FIGS. 7 and 8, a further embodiment of a tool 20*b* for installing internal self-locking rings may be seen. That tool is substantially identical in structure and operation to the tool 20*a* of FIGS. 4–6, except that additional provision is made in connection with controlling the position of the ring in an assembly in axial relationship to the parts of the assembly. As will be recalled, in the embodiment of FIGS. 4–6, that is controlled by adjusting the distance between the ram driving surface 50*a* and the housing shoulder 88 that ultimately is to abut the face 29*a* of the bore 27.

With the tool of FIGS. 7 and 8, such adjustment is again provided, but an additional feature is provided whereby the final axial position of the retaining ring may be located relative to the position of the retained part 31 rather than the face of the bore. In this regard, the head 90 of a pin 78*b* extending into the front of the ram 45 is arranged to project beyond the ram driving face 50*b*, but still short of the extended position of the front sleeve section 82.

The amount of the projection is controlled by threading or unthreading the pin 78*b*. A set screw 92 is positioned in a radial bore 94 of the front ram section to lock the pin 78*b* in its adjusted position. Access to the set screw is accomplished through a similar radial bore 96 in the forward sleeve section.

During operation, as shown in FIG. 8, as the sleeve sections retract when the part to be retained is engaged by the forward end of the rigid guide fingers 36, continued advancement of the ram will result in the head 90 of the pin 78*b* engaging the part 31 to be retained. This limits the ram advancement into the bore and hence the ultimate final axial location of the installed retaining ring 21*b* relative to the retained part. Such limitation is particularly desirable in instances where axial play between the ring and the end of the part to be retained is required. The amount of axial play can be precisely and uniformly established.

As will be apparent from FIG. 7, ram and sleeve replacement for different size rings requires removal of only the front sleeve section 82, but complete removal of the ram 44 since its front and rear sections are integral unlike the tool of FIG. 4.

Figure 10:
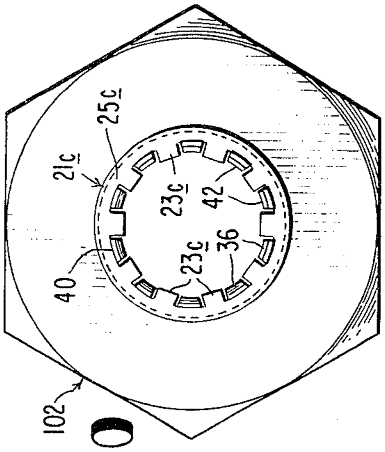
FIG. 10 is an end view of the tool of FIG. 9, looking toward the ring guide and centering fingers.
Figure 9:
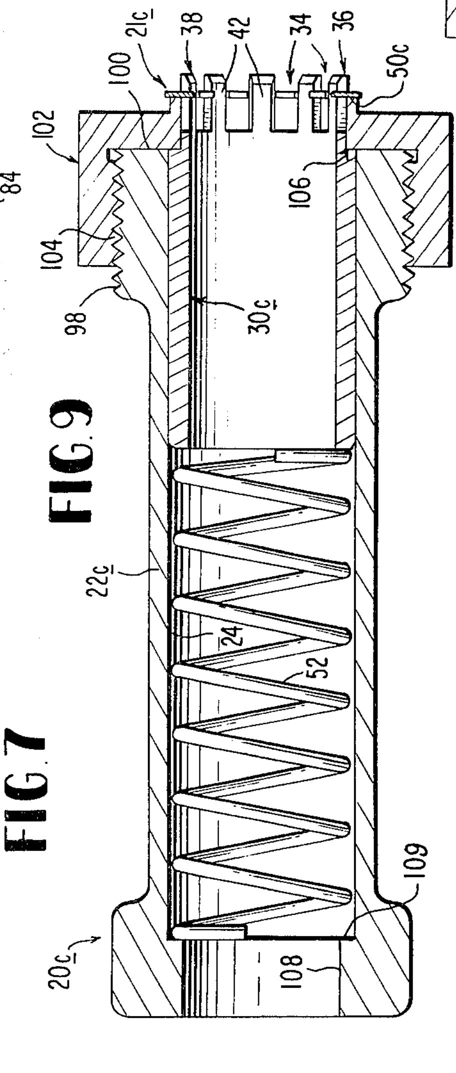
FIG. 9 is a transverse view, primarily in longitudinal section, depicting one embodiment of a tool according to the present invention for assembling external, closed self-locking rings.
Figure 11:
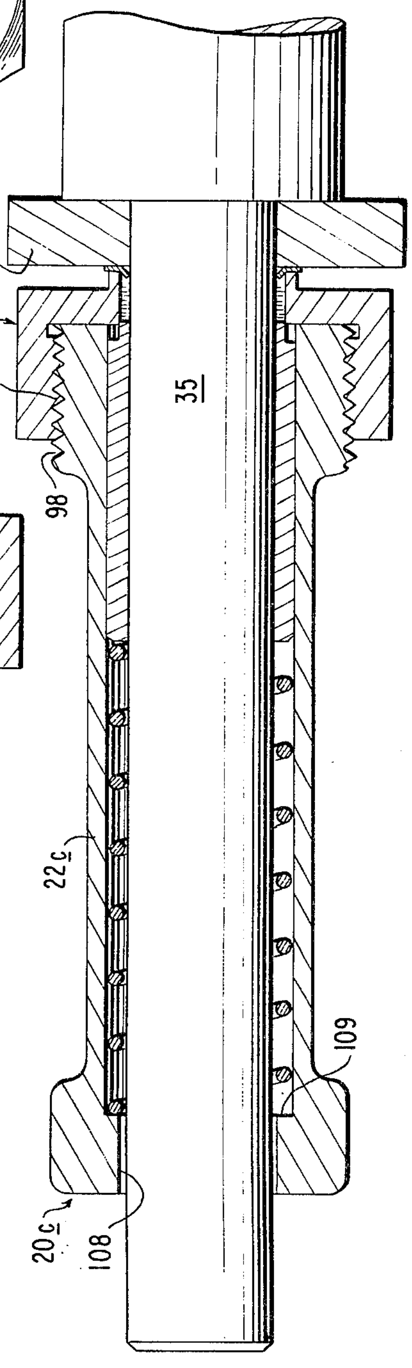
FIG. 11 is a transverse view similar to FIG. 9, but depicting a ring installation on a shaft.

FIGS. 9–11 depict basic aspects of a tool 20*c* according to the present invention which may be employed to assemble closed, external retaining rings. In FIG. 10, such a ring 21*c* having in plane locking prongs 23*c* is shown, but the tool may also be employed to install rings with inclined prongs of the type shown in the earlier referenced U.K. patent specification No. 627,059.

The tubular housing 22*c* is provided with a threaded portion 98 and a shoulder 100 at its forward end. An outer sleeve 102 is threaded internally at 104 to mate with the external threads 98 of housing 22*c*.The inside diameter of the outer sleeve 102 is slightly smaller than the inside diameter of the housing 22*c*, so that the slotted sleeve 30*c* is retained in the housing 22*c* by a shoulder indicated at 106.

As will be apparent from FIG. 10, the outer circumferential faces 40 of the rigid guide fingers 36 are contoured for centering engagement with the peripheral extend of the ring body 25*c* between the locking prongs 23*c*, i.e., the guide fingers fit closely to the inside diameter of the rim of the external ring. The sleeve 30*c* has a through-bore which is sized such that the inner circumferential faces 42 of the guide fingers 36 closely fit the diameter of the shaft 35 onto which the ring will be assembled (see FIG. 11). The fingers 36 are internally chamfered at 38 to provide a pilot lead-in for the tool centering action of the fingers on the shaft 35.

The tubular housing 22*c* has at its rear end a bore 108 whose diameter is slightly larger than the largest shaft size onto which the tool 20*c* will be placed to assemble a ring. The inside diameter of the coil spring 52, which bears against both the slotted sleeve 30*c* and an internal housing shoulder 109, is similarly slightly larger than the largest shaft size with which the tool will be used to assemble rings.

It will be appreciated that the outer sleeve 102 presents the magnetized ram driving surface 50*c* telescopingly located on the exterior of the slotted sleeve 30*c* for driving against the ring body 25*c*. The outer sleeve 102 may be removed from the housing by unthreading it, and the tubular slotted sleeve 30*c* may also then be removed. Both these parts may then be replaced by other parts suitable to other ring sizes. In the replacement parts, the section of the slotted sleeve 30*c* to be located within the housing will, as illustrated, be contoured in conformity with the interior of the housing and the projecting reduced diameter section of the slotted sleeve 30*c* will again be contoured in conformity with the interior of the outer sleeve 102 with which is in slidable engagement.

To install the ring on the shaft 35, the ring is merely positioned on the slotted sleeve 30*c* against the magnetized driving surface 50*c* and the tool 20*c* is advanced over the shaft 35. When the fingers 36 abut the part 37 to be retained on the shaft, the sleeve 30*c* retracts and the ram drives the ring to its final position. (See FIG. 11).

Figures 12, 13, 14, 15:
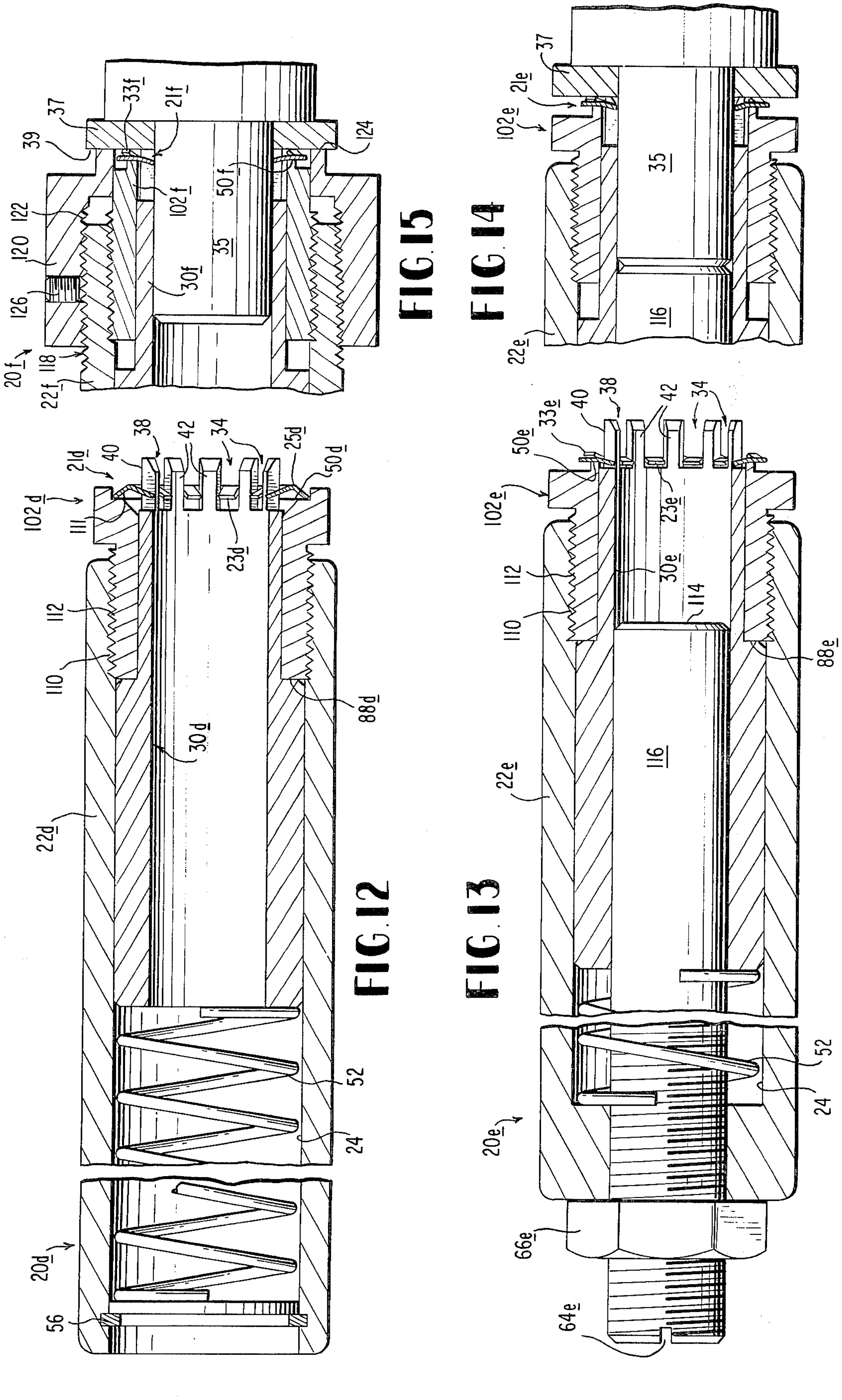
FIG. 12 is a partially broken transverse view of a further embodiment of a tool according to the present invention for assembling external closed self-locking rings, with the majority of the tool shown in longitudinal section.
FIG. 13 is a partially broken, transverse view of another embodiment of a tool according to the present invention for assembling external closed self-locking rings, with portions of the tool shown in section.
FIG. 14 is a partial transverse view depicting a ring installation on a shaft with the tool of FIG. 13.
FIG. 15 is a partial transverse view of a ring installation on a shaft with a tool according to the present invention.

FIG. 12 illustrates a slightly modified version of the tool shown in FIGS. 9–11, but adapted for assembling rings of the type shown in U.K. patent specification No. 780,237 of July 31, 1957, where the locking prongs of the ring 21*d* are supported by a body comprised of a formed or ribbed rim 25*d*. Here outer housing 22*d* is internally threaded, at its forward end, as indicated at 110. The threads 110 mate with external threads 112 of the outer sleeve 102*d*. As will be apparent, during the assembly process the ring 21*d* is pushed by the recessed driving surface 50*d* of the outer ram sleeve 102*d* acting on the ribbed body 25*d* of the ring. If desired, the ring may be pushed into position by exerting pressure at the bottom of its formed rim indicated at 111 in FIG. 12. This can be accomplished by proper shaping of the driving surface 50*d* to conform to the ribbed rim.

In the tool 20*d* fo FIG. 12, the slotted sleeve 30*d* which centers the ring by means earlier described, is held by the spring 52 against a shoulder 88*d* defined by the inner face of the ram sleeve 102*d*.

The ram sleeve 102*d* and the slotted sleeve 30*d* can be easily replaced be unthreading as in the case of the tool of FIGS. 9–11. For facilitating this operation, the ram sleeve 102*d* may have an externally hexagonal configuration as does the ram sleeve 102 of FIG. 10.

The tool 20*e* of FIGS. 13 and 14 employs similar features to the tool 20*d* of FIG. 12, but may be readily employed with external rings having resilient spring fingers 33*e* in addition to the locking prongs 23*e*, as well as those without such spring fingers. An example of such a ring is shown in U.S. Pat. No. 3,483,789 (issued Dec. 16, 1969).

The axial location of the assembled ring is controlled by adjusting the distance between the ram driving face 50*e* and the forward face 114 of a pin 116. The pin 116, which is mounted much like the ram of FIG. 7, thus acts as an adjustable stop. When the shaft 35 on which the ring is to be mounted abuts the forward face 114 of the pin (see FIG. 14), the axial advance of the ram driving face 50e, and thus the ring 21*e*, is limited.

In the tool 20*f* of FIG. 15, the axial location of the assembled ring is controlled by an adjustable stop positioned exteriorly of the sleeve 30*f*. As indicated at 118, the tubular housing 22*f* is threaded externally as well as internally.

The leading surface 50*f* of the ram sleeve 102*f* operates to push the ring 21*f* to its assembly position on the shaft 35. An additional sleeve 120, which is threaded internally as shown at 122, mates with the external threads 118 on the housing 22*f* and at its forward end is internally dimensioned in conformity with the external diameter of the ram sleeve 102*f*. The tool 20*f* is otherwise similar to the tool of FIGS. 13 and 14.

The forward surface 124 of this stop sleeve 120 projects beyond the ram surface 50*f* but short of the extended slotted sleeve position. This stop surface 124 will engage a surface 39 of the part 37 to be retained by the ring 21*f* so as to control the final position of the assembled ring by limiting the advance of the ram surface 50*f*. In this fashion, the ring may be positioned with its spring fingers 33*f* only partly compressed.

A set screw 126 is provided to hold the stop sleeve 120 in the desired position which is achieved by threading or unthreading that sleeve 120 until the desired setting is realized.

From the foregoing, it will be appreciated that the present invention provides for extreme reliability in the assembly of closed, self-locking retaining rings. Although particular rings have been illustrated and discussed with references to particular patents, tools according to the present invention can be adapted for use with any closed, self-locking rings having locking prong projections. For example, adaptation for use with triangular shaped rings as shown in U.S. Pat. No. 2,577,319 (issued Dec. 4, 1951) is envisioned.

The use of slotted sleeves to center the tool and the ring makes it unnecessary for an operator to center the ring relative to the shaft or housing, and consequently makes ring assembly more rapid.

The degree of skill required on the part of the operator is also reduced, and the need for out-of-plane locking prongs and their associated expenses are avoided.

At the same time, complete control over the ring during assembly eliminates the danger of ring misalignment which can result in assemblies unsuited for the required loading.

Use of adjustable stops enables accurate and reproducible control of the torque requirements for rotating parts, as well as the provision of a controlled amount of free play in an assembly where desired.

Adaptability for various sizes and types of rings through interchangeable slotted sleeves and rams enables manufacture and use of a complete line of tools at low cost.

Although the invention has been described with reference to preferred embodiments thereof, it will be appreciated that additions, modifications, substitutions and deletions may be made without departing from the spirit and scope of the invention as defined in the appended claims.

What is claimed is:

1. An assembly tool for closed self-locking retaining rings having a plurality of circumferentially spaced locking prongs projecting from a ring body comprising:
- an elongate tubular housing;
- axially extensible and retractable tubular sleeve means carried by said housing and mounted for slidable movement therein;
- spring means for biasing said tubular sleeve means to an extended position with one end thereof projecting from said housing;
- said one end of said tubular sleeve means being fashioned with a plurality of longitudinally extending and circumferentially spaced slots contoured for individual guiding reception of the circumferentially spaced locking prongs projecting from the ring body;
- said guide slots being bounded by circumferentially spaced, rigid guide and centering fingers presenting sidewalls of said guide slots and presenting two sets of circumferential centering faces;
- one set of said circumferential centering faces of said rigid fingers being contoured for centering engagement with the peripheral extend of the ring body between the locking prongs; the other set of said circumferential centering faces of said rigid fingers being contoured for tool centering engagement with the member which the locking prongs are to engage;
- ram means, carried by said housing coaxially with said sleeve means and in telescoping relationship therewith, for driving the ring into locked position;
- said ram means presenting a driving surface axially projecting from said housing to a position short of such extended position of said sleeve means and magnetically engageable with the body of the retaining ring when the retaining ring locking prongs are received in said guide slots of said sleeve means; and
- said sleeve means being operable, in response to resistance of axially advancing assembly force applied to the tool, to retract relative to said ram means so as to transmit assembly force to the ring body through said driving surface of said ram means.

2. An assembly tool according to claim 1 wherein:
- said spring means is an helically coiled spring means carried within said tubular housing.

3. An assembly tool according to claim 2 for internal self-locking retaining rings wherein:
- said ram means is telescopingly disposed within said tubular sleeve means.

4. An assembly tool according to claim 2 for external self-locking retaining rings wherein:
- said ram means is telescopingly disposed exteriorly of said tubular sleeve means.

5. An assembly tool according to claim 1 for internal self-locking rings wherein:
- said ram means is telescopingly disposed within said tubular sleeve means and said sleeve means is slidable thereon.

6. An assembly tool according to claim 5 including:
- adjusting means for adjusting the projection of said driving surface of said ram means from said housing.

7. An assembly tool according to claim 5 including:
- adjustable stop means projecting beyond said driving surface of said ram means to a position short of said extended position of said sleeve means.

8. An assembly tool according to claim 5 wherein:
- said tubular sleeve means comprises a first section externally contoured in conformity with the interior of said housing and a removable second section containing said slotted end; and
- said ram means comprises an end portion containing said driving surface and externally contoured in conformity with the interior of said removable second section of said tubular sleeve means.

9. An assembly tool according to claim 8 including:
- adjusting means for adjusting the projection of said driving surface of said ram means from said housing.

10. An assembly tool according to claim 8 including:
- adjustable stop means projecting beyond said driving surface of said ram means to a position short of said extended position of said sleeve means.

11. An assembly tool according to claim 1 for external self-locking rings wherein:
- said ram means is telescopingly disposed exteriorly of said tubular sleeve means and said sleeve means is slidable therein.

12. An assembly tool according to claim 11 including:
- adjustable stop means disposed interiorly of said tubular sleeve means at a location short of said driving surface of said ram means.

13. An assembly tool according to claim 12 wherein:
- said ram means comprises a second sleeve removably threadably engaged with said housing; and
- said tubular sleeve means comprises a first section externally contoured in conformity with the interior of said housing and a second section containing said slotted end and exteriorly contoured in conformity with the interior of said second sleeve.

14. An assembly tool according to claim 11 including:
- adjustable stop means disposed exteriorly of said tubular sleeve means and projecting forward of said driving surface of said ram means to a position short of the extended position of said sleeve means.

15. An assembly tool according to claim 14 wherein:
- said ram means comprises a second sleeve removably threadably engaged with said housing; and
- said tubular sleeve means comprises a first section externally contoured in conformity with the interior of said housing and a second section containing said slotted end and exteriorly contoured in conformity with the interior of said second sleeve.

16. An assembly tool according to claim 11 wherein:

said ram means comprises a second sleeve removably threadably engaged with said housing; and said tubular sleeve means comprises a first section externally contoured in conformity with the interior of said housing and second section containing said slotted end and exteriorly contoured in conformity with the interior of said second sleeve.

17. The tool according to claim 1 wherein said driving surface of said ram means is magnetically engageable with the body of the retaining ring.

18. In an assembly tool for closed, self-locking retaining rings including extensible and retractable centering means for centering the ring on ram means recessed relative to the centering means, the improvement wherein:

said centering means comprises tubular sleeve means carried by a housing in telescoping relationship with said ram means and having one end fashioned with a plurality of circumferentially spaced guide slots bounded by circumferentially spaced rigid guide and centering fingers operable to center the ring by engagement with the body thereof and to pilot the tool by engagement with the member to which the ring is to be assembled.

19. The improvement according to claim 18 further comprising:

adjustable stop means for controlling the position of the ring in an assembly in axial relationship to the parts of the assembly.

20. The improvement according to claim 18 for assembling internal rings wherein:

said tubular sleeve means comprises a first section externally contoured in conformity with the interior of said housing and a removable second section containing said slotted end; and said ram means comprises an end portion containing a driving surface and externally contoured in conformity with the interior of said removable second section of said tubular sleeve.

21. The improvement according to claim 20 further comprising:

adjustable stop means for controlling the position of the ring in an assembly in axial relationship to the parts of the assembly.

22. The improvement according to claim 21 wherein said adjustable stop means comprises:

adjusting means for adjusting the projection of said driving surface of said ram means from said housing.

23. The improvement according to claim 21 wherein:

said adjustable stop means projects beyond the driving suface of said ram means to a position short of the sleeve means in its extended position.

24. The improvement according to claim 18 for assembling external rings wherein:

said ram means comprises a second sleeve removably threadably engaged with said housing; and said tubular sleeve means comprises a first section externally contoured in conformity with the interior of said housing and a second section containing said slotted end and exteriorly contoured in conformity with the interior of said second sleeve.

25. The improvement according to claim 24 further comprising:

adjustable stop means for controlling the position of the ring in an assembly in axial relationship to the parts of the assembly.

26. The improvement according to claim 25 wherein:

said adjustable stop means is disposed exteriorly of said tubular sleeve means and projects beyond the driving surface of said ram means to a position short of the sleeve means in its extended position.

27. The improvement according to claim 25 wherein:

said adjustable stop means is disposed interiorly of said tubular sleeve means at a location short of the driving surface of said ram means.

* * * * *